C. E. BEARD.
VEGETABLE SLICER.
APPLICATION FILED JUNE 5, 1915.

1,259,477.

Patented Mar. 19, 1918.

UNITED STATES PATENT OFFICE.

CLEMENT E. BEARD, OF COLUMBIANA, OHIO.

VEGETABLE-SLICER.

1,259,477. Specification of Letters Patent. Patented Mar. 19, 1918.

Application filed June 5, 1915. Serial No. 32,335.

*To all whom it may concern:*

Be it known that I, CLEMENT E. BEARD, a citizen of the United States, residing at Columbiana, in the county of Columbiana and State of Ohio, have invented certain new and useful Improvements in Vegetable-Slicers, of which the following is a specification.

My invention relates to vegetable slicers and has for its object the provision of a base or a base-board with simple and efficient means thereon for holding an ordinary culinary knife or other conventional knife of suitable size in operative position on the board. A further object is the formation of said means in such a manner that the knife may be quickly and easily fitted in and removed from such means. Other objects will appear hereinafter.

I have shown an exemplification of my invention in the accompanying drawing, in which—

Figure 1:
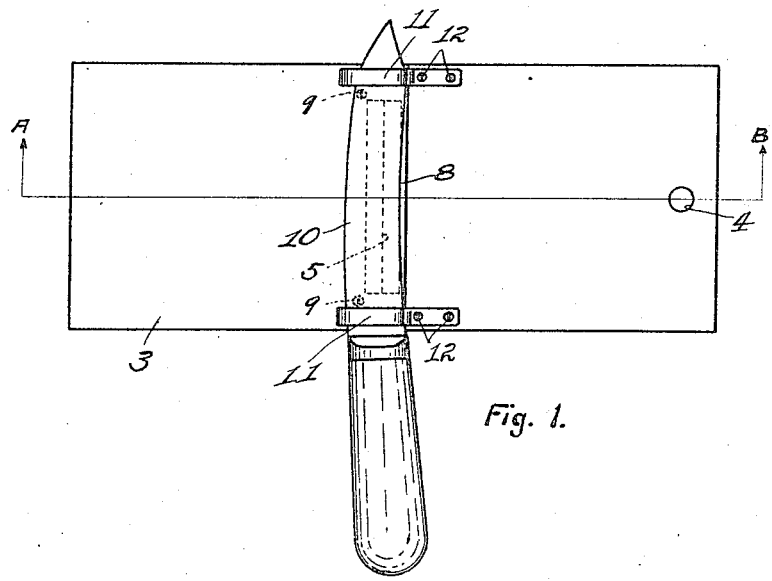
Figure 1 is a plan view of a device embodying my invention.
Figure 2:
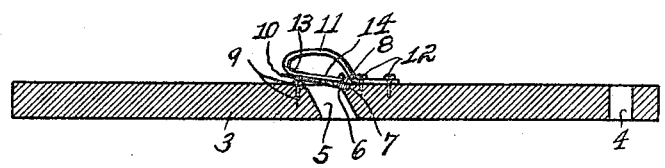
Fig. 2 is a section of the same taken on line A—B.

Referring more particularly to the drawing, I provide a base 3, preferably of wood and rectangular in shape, although the base may be changed in shape or material to suit requirements. At one end of the base 3, I provide a perforation 4 for use in engaging a nail or other member for supporting the board when not in use. Near the central portion of the board, I provide an elongated perforation or slot 5. The length of perforation 5 is sufficient to permit cutting of desired vegetables and the like. It may be made quite short when only potatoes or fruits are to be cut, but when the board is designed to be used for larger articles, such as cabbages, then the slot should be proportionally longer. The width of the slot 5 is not material, so long as it is wide enough to permit the passage of the cut fruit or vegetables without clogging.

Adjacent one edge of the slot 5, I provide a cut 6 with a shoulder 7 at one side thereof. The cut 6 is adapted to receive the back edge portion 8 of a knife with the back edge of such knife resting against the shoulder 7. The shoulder 7 provides a stop against which the knife presses in operation. The knife may be of any conventional design, such as an ordinary butcher knife, a bread knife, or any other knife ordinarily found about a kitchen or culinary, which is of sufficient size and having a sufficiently sharp edge. One advantage of this invention is that it is capable of using any conventional knife, and that such knife can be easily and quickly adjusted in operative position and just as easily and quickly removed therefrom.

In order to adjust the knife so that the vegetables, and the like, may be cut thicker or thinner, I provide an adjusting means under the front edge of the knife, comprising preferably two adjusting screws 9. By means of a screw-driver, not shown, the screws 9 may be adjusted into and out of the base 3, so that their heads will protrude at different heights from the base 3, thereby raising the cutting edge 10 of the knife to different heights above the base 3.

I provide simple holding means for holding the knife in position on the screws 9 and against shoulder 7. The means I prefer are springs bent in such shapes that the yieldable ends thereof will rest flat on the knife blade and other portions thereof be secured rigidly to the base 3. In the form shown, the springs 11 are secured to the base 3 by means of screws 12. A portion of the springs 11 is preferably curved or turned up, as at 13, so that the back edge of the knife will easily pass between the heads of screws 9 and the springs 11 to provide an easy means for adjusting the knife into position on the base. The flat portions 14 of the springs preferably rest on the knife blade substantially throughout the width of such blade, so that an even pressure will be exerted substantially over the width of the knife blade, thereby insuring that the cutting edge will be held firmly against the screws 9 and the back edge will rest firmly in cut 6 and against shoulder 7. The portions of the springs between the point 13 and the portions secured to the base 3 may be in any form to give such springs strength and yieldability for adjusting the knife into and out of operative position on the base.

Articles to be sliced are moved along the base 3 toward the knife, so that the cutting edge 10 of the latter will sever the lowermost portion and permit such portion to pass through slot 5. When so desired, the base 3 may be used for cutting bread, meat, or it may be put to other uses for which similar boards are found useful about kitchens and the like.

While I have illustrated and described the preferred form of construction of my invention, I do not desire to be limited to the precise details set forth, but desire to avail myself of such variations and changes as come within the scope of the appended claims.

What is claimed is:

1. A vegetable slicer comprising a base having a perforation therethrough and a shoulder adjacent the perforation; adjusting screws in the base; a knife disposed over the perforation and having its back edge engaging the shoulder and its cutting edge portion resting on the adjusting screws; and springs having portions secured to the base adjacent the shoulder and other portions lying flat on the blade of the knife and holding the latter firmly on the adjusting screws and against the shoulder.

2. A vegetable slicer comprising a base having a perforation therein with a shoulder at one side of the perforation; a knife disposed over the perforation with its heel engaging said shoulder; adjusting means under the edge portion of the knife; and springs, each disposed in a loop above the knife with one end portion secured to the base adjacent the heel of the knife and the other end portion resting on the knife resiliently holding the latter against the adjusting means and said shoulder.

In testimony whereof I have signed my name to this specification, in the presence of two subscribing witnesses, on this 1st day of June, A. D. 1915.

CLEMENT E. BEARD.

Witnesses:
NORA HAVIL,
MARY HAVIL.

Copies of this patent may be obtained for five cents each, by addressing the "Commissioner of Patents, Washington, D. C."